United States Patent
Li

[11] Patent Number: 5,904,176
[45] Date of Patent: May 18, 1999

[54] SILENT VALVE BALL COCK ASSEMBLY

[75] Inventor: Frank Li, Xiamen, China

[73] Assignee: WDI International, Bedford Heights, Ohio

[21] Appl. No.: 08/920,154

[22] Filed: Aug. 26, 1997

[51] Int. Cl.[6] ................................. F16K 31/18
[52] U.S. Cl. ................... 137/434; 137/414; 137/426; 137/436; 137/437
[58] Field of Search .................. 137/414, 426, 137/436, 437, 432

[56] References Cited

U.S. PATENT DOCUMENTS

| | | | |
|---|---|---|---|
| 245,172 | 8/1881 | Hurley | 356/62 |
| 2,635,622 | 4/1953 | Owens | 137/218 |
| 2,911,000 | 11/1959 | Doyle | 137/414 |
| 2,986,155 | 5/1961 | Doyle | 137/414 |
| 3,074,684 | 1/1963 | Doyle | 137/414 |
| 3,429,333 | 2/1969 | Schoepe et al. | 137/414 |
| 3,495,803 | 2/1970 | Schoepe et al. | 137/414 |
| 3,669,138 | 6/1972 | Schoepe et al. | 137/414 |
| 3,916,454 | 11/1975 | Schoepe et al. | 137/432 |
| 4,080,986 | 3/1978 | Schoepe et al. | 137/432 |
| 4,100,928 | 7/1978 | Schoepe et al. | 137/414 |
| 4,108,202 | 8/1978 | Schoepe et al. | 137/436 |
| 4,182,364 | 1/1980 | Gilbert et al. | 137/426 |
| 4,299,428 | 11/1981 | Becker et al. | 137/414 |
| 4,327,941 | 5/1982 | Schoepe | 137/441 |
| 4,338,964 | 7/1982 | Schoepe | 137/436 |
| 4,416,302 | 11/1983 | Schoepe | 137/315 |
| 4,494,562 | 1/1985 | Stephens | 137/436 |
| 4,562,859 | 1/1986 | Shames et al. | 137/437 |
| 4,703,653 | 11/1987 | Schoepe et al. | 137/429 |
| 4,938,245 | 7/1990 | Schoepe et al. | 137/436 |
| 5,035,257 | 7/1991 | Autunez | 137/414 |
| 5,452,482 | 9/1995 | Nichols-Roy et al. | 137/441 |
| 5,584,080 | 12/1996 | Nicholas-Roy et al. | 4/415 |
| 5,594,959 | 1/1997 | Nichols-Roy et al. | 137/441 |
| 5,603,128 | 2/1997 | Nichols-Roy | 4/325 |

Primary Examiner—George L. Walton
Attorney, Agent, or Firm—Howard M. Cohn

[57] ABSTRACT

A float-controlled, ball cock assembly comprises an improved two-piece valve useful with either a fixed height or an adjustable height riser. The two-piece valve includes a resilient valve seal element and a rigid valve cap fitted together to form an annular chamber therebetween. A rigid spacer sleeve is positioned in the chamber to limit the movement of the valve seal element between the closed position in contact with a valve seat and the open position spaced from the valve seat. The adjustable height riser includes inlet and outlet tubes, each composed of two parts telescopically engaging one another. Adjustment of the height of the riser is achieved by the use of one or more T-shaped tabs which are secured by a lock collar threaded onto the outer of the two telescoping outlet tubes and which can be moved locking into and out of engagement with radially extending grooves on the outer surface of the inner outlet tube.

5 Claims, 6 Drawing Sheets

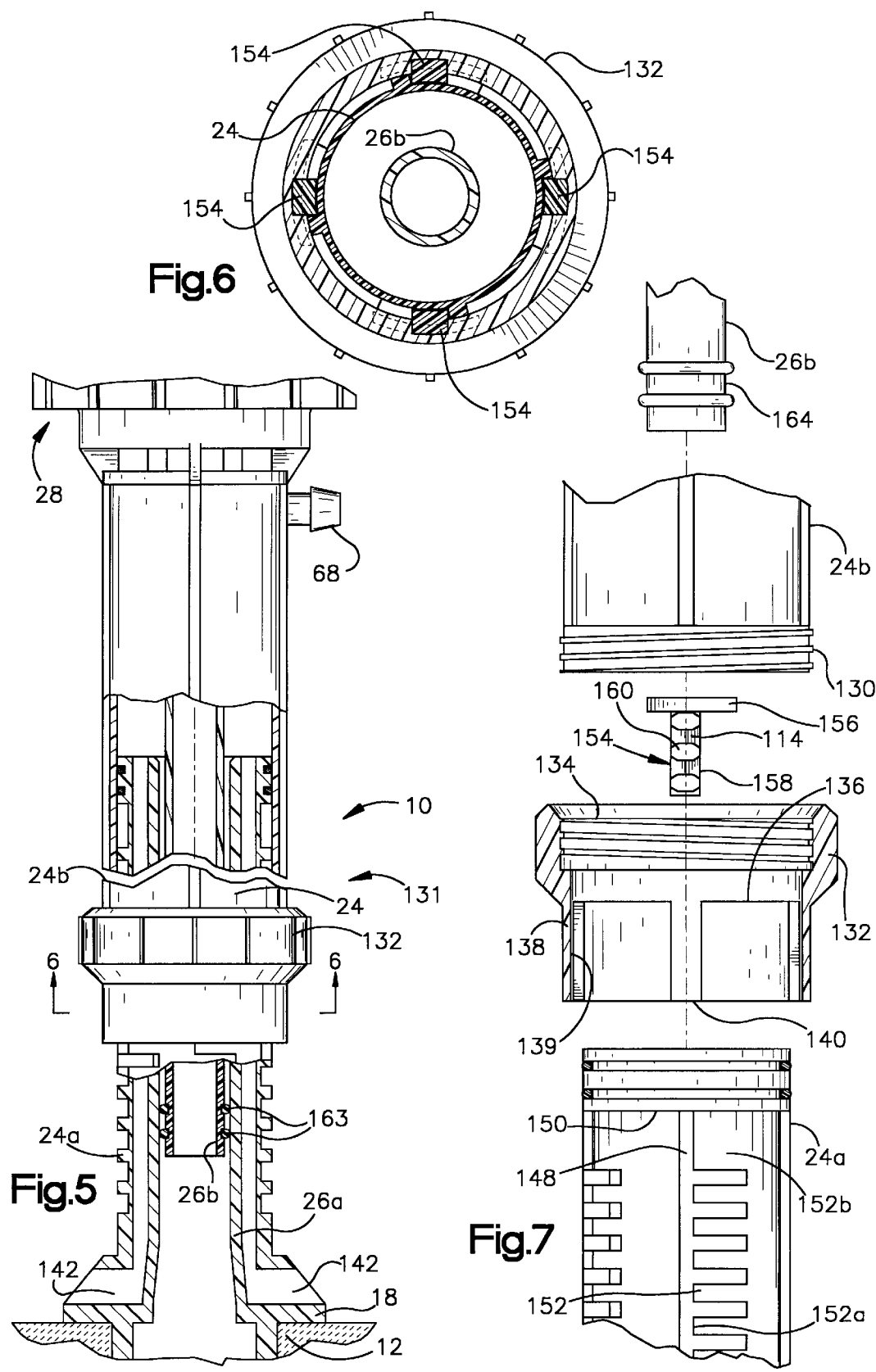

SILENT VALVE BALL COCK ASSEMBLY

BACKGROUND OF THE INVENTION

1. Field of the Invention

This invention relates to a ball cock construction of the type used for the control of liquid levels in tanks. More specifically, the invention relates to an improved ball cock assembly for use in the flush tank of a toilet or the like, and an adjustable riser to use with the ball cock assembly.

2. Discussion of the Prior Art

A conventional ball cock assembly includes an inlet tube that allows water under pressure to flow into a flush tank through a float operated ball cock valve mounted atop the tube above the normal water level. An outlet tube extends downward from the valve so that when the float operated valve is open, water will flow into the outlet tube and then into the flush tank. The ball cock valve controls the operation of the ball cock assembly, and must be constructed to provide reliable operation through thousands of flush cycles. Therefore, it is desirable to use a ball cock valve which is of rugged construction, and which is substantially fail-safe.

Toilet tanks are made in many different sizes and shapes, and in many different heights. The ball cock assembly is mounted at a height commensurate with the height of the tank. Upon failure of the assembly for any reason, it is common to obtain a replacement assembly which is properly sized for the tank, or which can be quickly and securely adjusted to different lengths according to the tank size.

U.S. Pat. No. 4,100,928 describes a valve assembly for a ball cock valve including a riser having telescopically adjustable concentric inlet and outlet tubes. Each of the concentric tubes is composed of an upper and a lower member. Adjustment of the tubes is achieved by the use of a continuous spiral grooves or a plurality of discrete, spaced apart grooves on one member and a plurality of fingers at the end of the second member, each with radially inwardly extending projections. The riser includes a lock collar which slips over the end of the fingers and when threaded into place, flexes the fingers inwardly to urge the projections into the grooves. The deflection of the fingers during assembly or adjustment of the riser increases the likelihood of breaking one of the fingers. The height of the riser is adjusted by unscrewing the lock collar to release the projections from the groove, and manually telescoping the two tubes to the required height followed by threading the lock collar over the fingers to force the projections into engagement with a corresponding groove.

The ball cock construction typically comprises a valve seat disposed between an inlet and a plurality of liquid outlets spaced circumferentially around the inlet, a resilient valve seal, a valve cover and a pilot valve pin extending through the cover and valve seal. The typical ball cock construction can utilize a siphon arrangement to prevent back flow of water in the event of a total or substantial drop in the pressure of the incoming water.

U.S. Pat. No. 4,108,202 likewise describes a ball cock with a vertically adjustable outlet tube. In the manner similar to that described in U.S. Pat. No. 4,100,928, two telescoping members which comprise the outlet tube of the riser are provided with grooves, either spiral, or discrete vertically spaced on one of the members, and projections on the end of the other member, adapted to engage the grooves. The projections are at the end of flexible fingers which are flexed radially inwardly to engage the grooves, and are held in the grooves by a threaded lock collar. To make the height adjustment, the collar must be threaded one way to release the fingers from the groove, and then threaded the other way to re-engage the projections with the groove.

U.S. Pat. No. 4,182,364 likewise describes a vertically adjustable riser which contains circumferential grooves on one member and resilient fingers with inward projections to be locked into one of the grooves. The fingers are at the upper end of the outer member and have gaps between them allowing inward deflection. A lock collar is threaded on to the upper end of the outer member and as the member is progressively tightened, deflects the projection into engagement with the groove. To adjust the vertical height of the riser, the collar must be unscrewed to release the deflected projections from the groove.

U.S. Pat. No. 4,703,653 describes a plastic ball cock float structure of the general type useful in the present invention. The float contains a vertical channel adapted to receive the riser. The float moves up and down on the riser in response to changes in the water level in the tank, thereby closing and opening a water inlet valve.

OBJECT AND SUMMARY OF THE INVENTION

It is an object of the present invention to provide a ball cock valve assembly as defined in one or more of the appended claims and, as such having the capability of being constructed to accomplish one or more of the following subsidiary objects.

One object of the present invention is to provide a novel two-piece valve assembly for use in a ball cock valve, the assembly utilizing a rigid sleeve between the valve cap and the seal to limit flexing of the seal when opening and closing, thereby reducing flex fatigue and failure of the seal.

Another object of the present invention is to provide a valve assembly having enhanced flow control as compared to prior art devices.

Yet another object of the present invention is to provide an adjustable riser, capable of being quickly and simply adjusted, for a ball cock assembly which permits the use of the assembly in a variety of fill tanks having differing heights.

These and other objects, which will become evident upon a full reading of the description, are achieved in the manner to be more fully described by reference to the drawings and detailed discussion which follows. The present invention incorporates plural inventive concepts including a unique, more reliable valve assembly and a novel riser height adjustment feature.

In one aspect of the invention, a two-piece float-controlled valve assembly is described which is useful with a valve seat for controlling the liquid level in a tank such as a flush tank for a toilet. The valve assembly includes a rigid valve cap and a resilient valve seal element which is adapted to form a water-tight seal with the valve seat. An axial hole extends through the cap and the seal, and a pilot valve pin extends within the axial hole through both of the former valve assembly members. The valve pin is pivotally joined to a float by a valve operating lever and a connecting rod. Vertical movement of the float downward as the tank empties serves to move the valve seal element out of engagement with the valve seat to permit liquid to flow into the tank to restore the liquid level.

The valve seal element and the valve cap fit together to form a chamber therebetween. The valve cap is generally circular and dome-shaped, having a convex top surface and a concave inner surface facing the valve seal. The inner surface of the valve cap contains a peripheral groove. The resilient valve seal element includes first and second opposed generally parallel surfaces, the first surface facing the valve cap, and the second surface shaped so as to cover and seal the valve seat. The first surface of the seal contains a raised, peripheral edge which engages the peripheral groove in the cap. The valve cap contains an annular elastomeric grommet fitted into an annular hole extending through the cap. The grommet is anchored against movement relative to the cap, and contains the small hole through which the pilot valve pin passes. The valve seal element contains a groove in its first surface coaxially aligned with the grommet. A substantially rigid cylindrical sleeve is positioned in the chamber between the valve cap and the valve seal. A first end of the sleeve preferably contains one or more slots extending axially toward, but terminating short of the opposite second end. The slotted end of the sleeve fits into the groove of the valve seal element and the opposite second end fits into the grommet, preferably in a groove therein. The slots in the sleeve extend between about 40% and 80% of the distance from the first end to the second end. The sleeve serves to limit the distance that the resilient seal moves toward the rigid cap when liquid is evacuated from the chamber.

In accordance with another aspect of the invention, a vertically adjustable riser for the ball cock valve assembly is composed of a pair of telescopically engagible tubular shafts including an inner shaft having an upper end and lower end, and an outer shaft disposed coaxial with the inner shaft and likewise having an upper end and a lower end. An annular lock collar is threaded on to the lower end of the outer shaft, the collar having an inner diameter slightly greater than that of the inner shaft to permit the collar to be slipped over and moved axially along the inner shaft. The collar contains at least one, and preferably between two (2) and six (6) slots in the inner diameter thereof extending in the axial direction. The outer surface of the inner shaft contains a stop abutment extending vertically, i.e., in the axial direction of the tube corresponding to each slot in the collar. A row of discrete grooves are parallel to one another and are spaced along the inner shaft so that one end of the grooves terminates at the stop, and the second end of the grooves terminates at a location remote from the stop. The grooves extend in the radial direction around the tube. Generally, each groove extends about one-half (½) of the distance from the stop to the next adjacent stop. A removable tab is disposed in each slot in the collar. The tab, upon rotation of the lock collar in a first direction, engages one of the radially extending parallel grooves on the inner shaft to prevent telescoping movement of the two shafts. When the collar is rotated in the opposite, second direction, the tab becomes disengaged from the groove to permit relative telescoping movement. The tab preferably is in the shape of a T with the cross bar of the T-shaped tab having a radius of curvature corresponding to the radius of the internal threads of the lock collar. The leg of the T-shaped tab is received into the slot, and contains at least one projection extending radially inward therefrom to engage one of the grooves on the inner shaft. Preferably, the T-shaped tab contains two (2) or three (3) projections, which concurrently engage adjacent grooves. The interior of the collar includes a shoulder where the threaded portion intersects the slotted portion. The cross bar of the T-shaped tab contacts the shoulder and is anchored against the shoulder by the lower threaded end of the outer shaft when the collar is threaded on to the outer shaft.

Another aspect of the present invention relates to a ball cock assembly for regulating the level of a liquid in a tank, in combination with a riser including a vertical inlet tube having a lower end communicating with a liquid supply source and an upper end terminating in a valve seat, and an outlet tube surrounding, and in axial alignment with the inlet tube and in fluid communication therewith when the valve assembly in the ball cock assembly is open. The valve assembly is in normal contact with the valve seat to prevent the flow of liquid through the inlet tube into the outlet tube when the valve assembly is closed. The valve assembly includes a rigid valve cap and a resilient valve seal element forming a valve chamber therebetween. A valve cover is secured to the upper end of the riser and supports a pilot valve pin having a free end extending down through the valve cover and the valve assembly. A float assembly comprising a float, a connecting rod and a valve operating lever is operatively connected to the pilot valve pin. The lowering of the liquid level in the tank causes the float to move down, which in turn causes the valve pin to reduce the liquid pressure in the valve chamber to permit the water pressure in the inlet tube to lift the valve assembly from the seat thereby allowing liquid to flow through the valve assembly from the inlet tube into the outlet tube and then into the tank.

Further in accordance with the invention, the ball cock assembly is usable with a fixed height riser, or an adjustable height riser. When used with an adjustable height riser, the riser includes an inlet tube and an outlet tube concentrically disposed therearound. The outlet tube comprises outer and inner tubular shafts telescopically movable with respect on one another. An annular lock collar is joined to the lower end of the outer shaft and has an inner diameter slightly larger than the diameter of the inner shaft. The collar contains an axially extending slot on the inner surface thereof. The outer surface of the inner shaft contains at least one vertical stop, and a row of grooves parallel to one another, evenly spaced along the inner shaft, extending radially around the shaft orthogonal to the stop. One end of the each groove terminates at the stop and the other end terminates at a location remote from the stop. A removable tab is positioned in the slot in the collar and engages one of the grooves to prevent relative axial movement between the two shafts. The tab is simply and quickly disengaged from the groove simply by rotating one shaft a fraction of a turn relative to the other shaft.

BRIEF DESCRIPTION OF THE DRAWINGS

FIG. 5 is an elevational view showing a ball cock assembly with an adjustable riser, partially in cross-section;

FIG. 6 is a cross-sectional view taken along lines 6—6 of FIG. 5;

FIG. 7B is a three dimensional view of the lock collar assembly of FIG. 7A; and

DETAILED DESCRIPTION OF THE INVENTION

Figure 1:
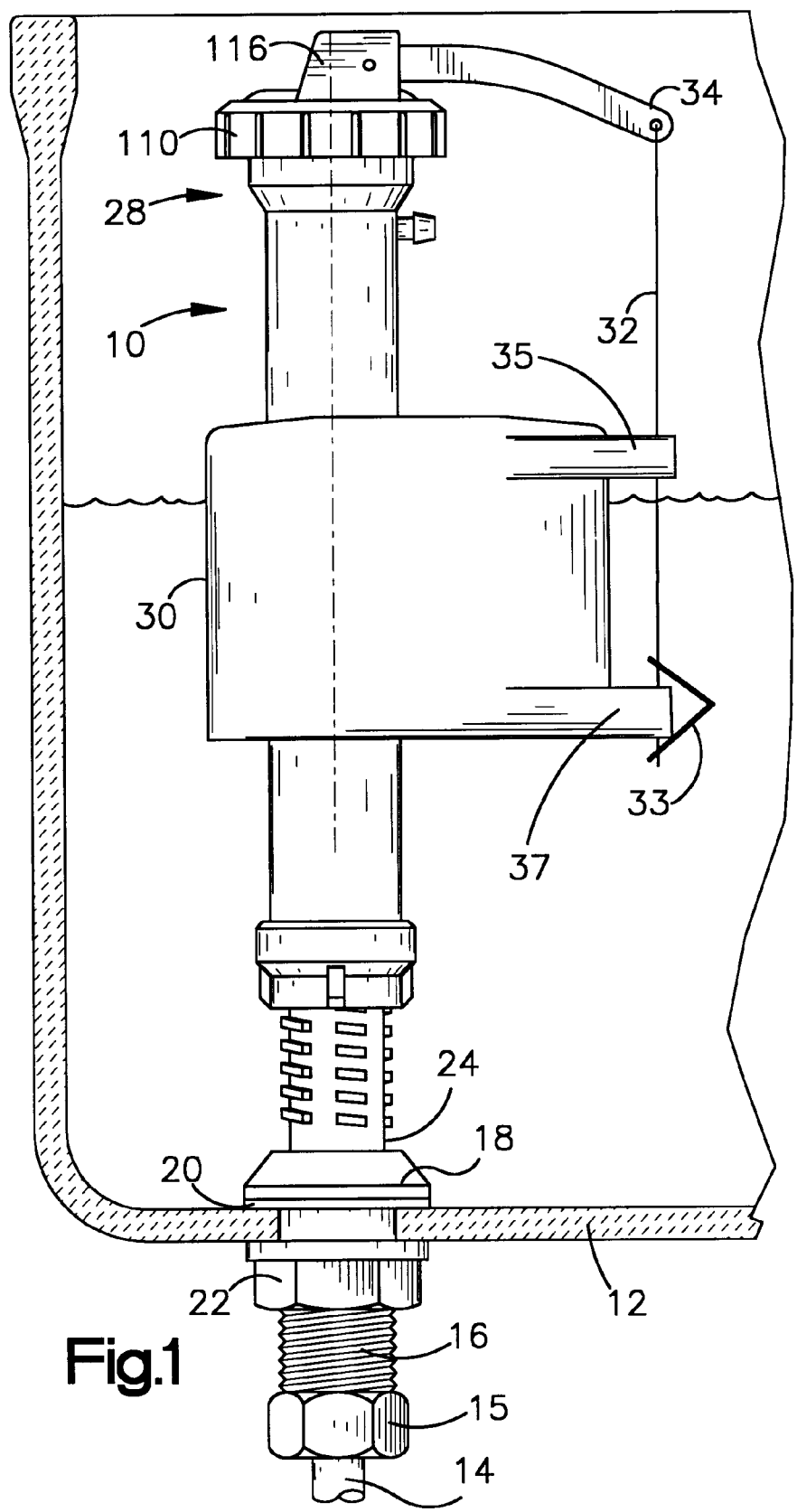
FIG. 1 is an elevational view of a complete ball cock assembly in a flush tank of a toilet bowl.

Referring now to FIG. 1 for a typical setting for the present invention, a silent flush ball cock assembly 10 is shown optionally installed in a conventional toilet water flush tank 12 having a water supply line 14 delivering pressurized water into the ball cock assembly through a threaded connection 16 at the bottom of the assembly. The ball cock assembly 10 is secured and sealed to the flush tank 12 by flange 18, resilient gasket 20 and flanged nut 22. In typical fashion, water is exhausted from the flush tank 12 by a separate discharge valve (not shown) in the bottom of the tank normally operated by a lever or button mounted to the exterior of the tank.

The ball cock assembly 10 includes a riser 131 generally including concentric outlet tube 24 and inlet tube 26, as shown in FIGS. 5–8, and a flow controlling valve mechanism 28 disposed at the top of the tubes 24 and 26. A float 30 is vertically movable along the exterior surface of the outlet tube 24 in response to the changing level of water in the flush tank 12. The float 30 is operably connected by connecting rod 32, extending through upper rod guide 35 and lower rod guide 37, to valve operating lever 34. Downward movement of the float 30 causes the valve mechanism 28 to open and upward movement of float 30 causes the valve mechanism 28 to close. The upper and lower rod guides 35 and 37 reduce the tendency of the float to rotate about the shaft 24 and to assist in keeping the float 30 aligned with valve operating lever 34. Minor adjustments of water level in flush tank 12 may be accomplished in the usual manner by selective adjustment of the float 30 along the connecting rod 32 using conventional means, such as spring clip 33.

Figure 2:
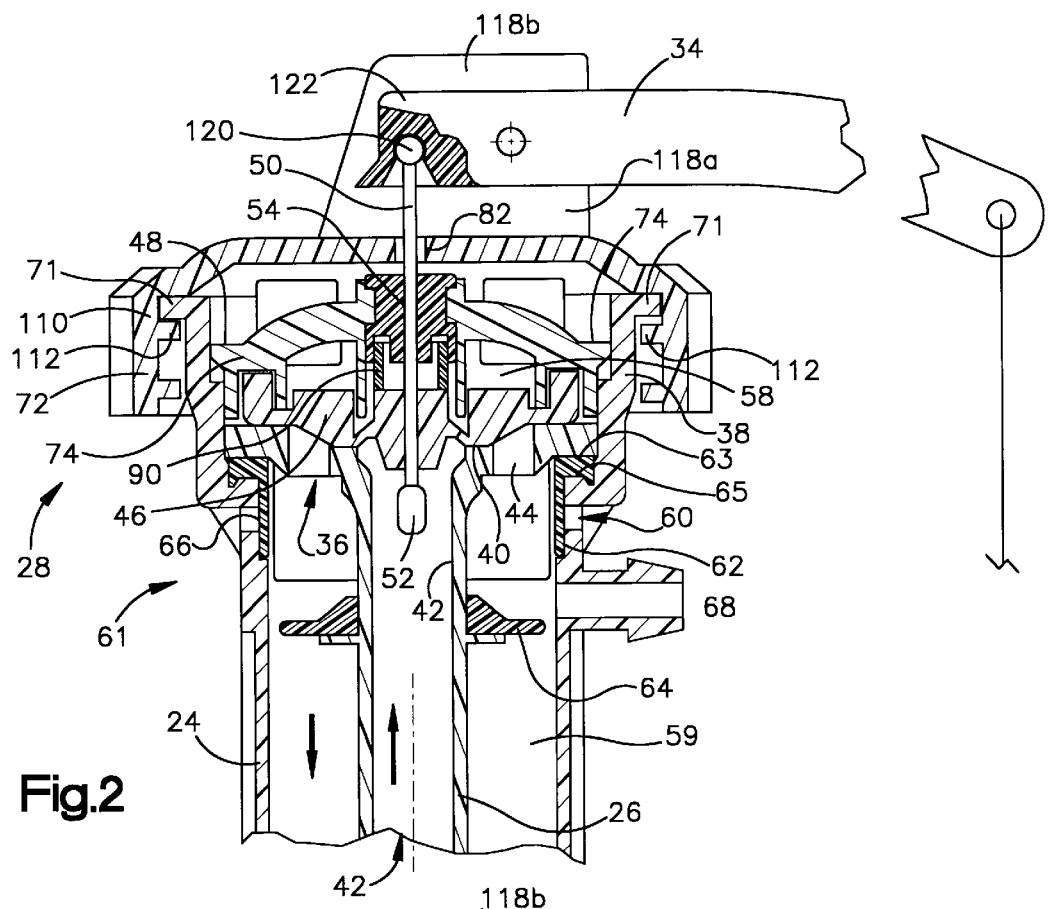
FIG. 2 is a detailed view of a ball cock assembly with the valve closed.
Figure 3:
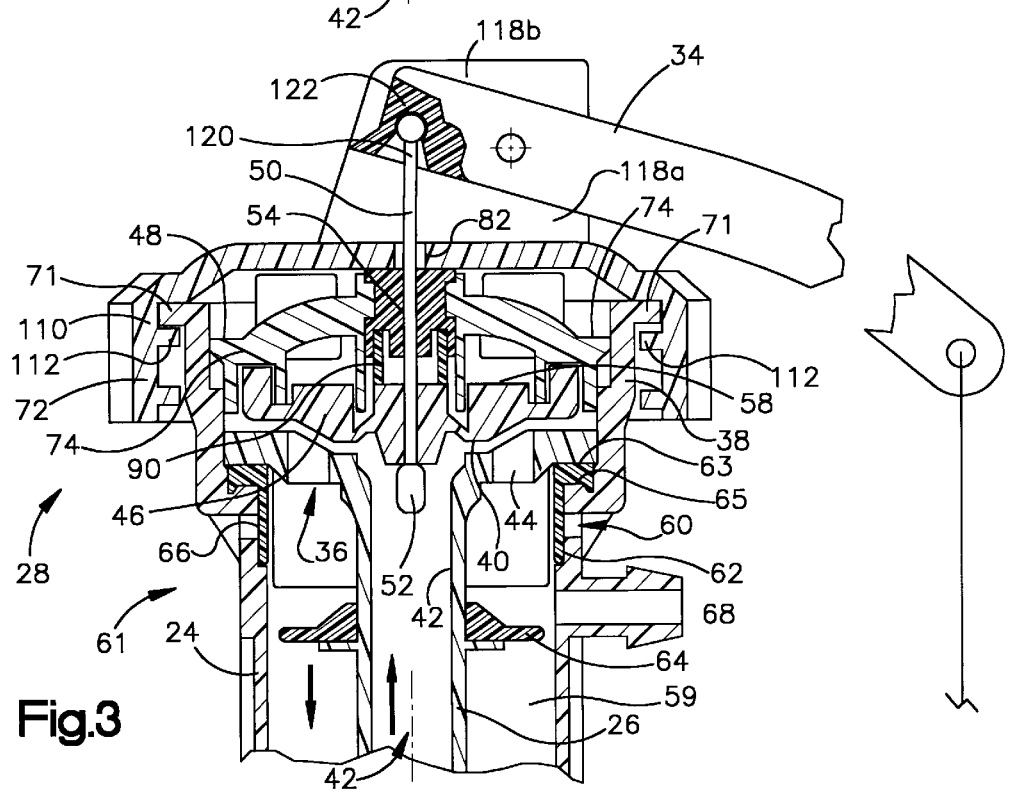
FIG. 3 is a detailed view of a ball cock assembly with the valve open.
Figure 4:
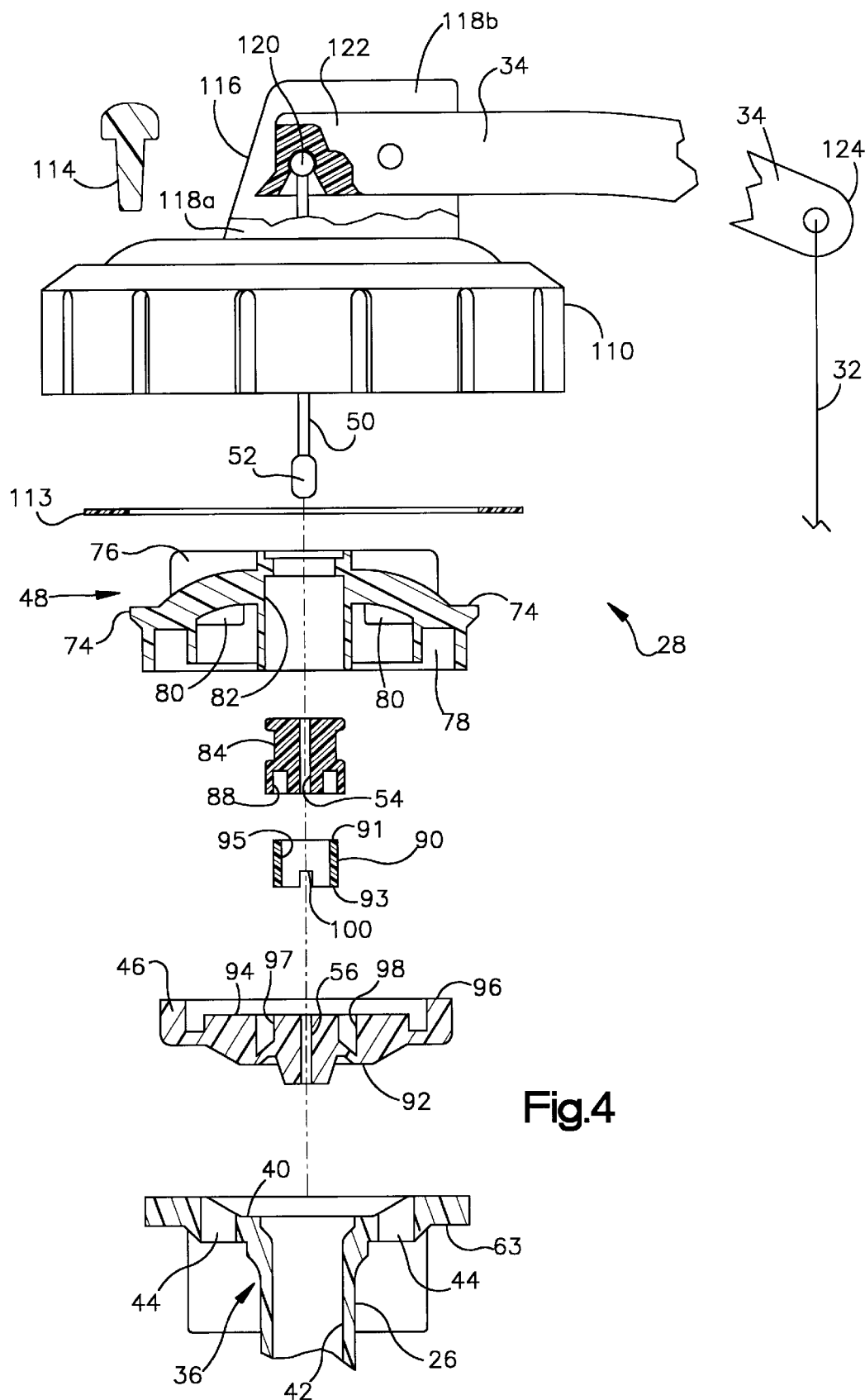
FIG. 4 is an exploded view of the valve assembly of FIGS. 2 and 3, partially in cross-section.

Referring now to FIGS. 2–4, the details of the valve mechanism or assembly 28 are described. As previously mentioned, the vertical inlet tube 26 is concentrically positioned within the outlet tube 24. The upper end 36 of the inlet tube 26 terminates in a valve seat 40 adjacent the upper end 38 of the outlet tube 24. The valve mechanism 28 of the valve cock assembly 10 includes the valve seat 40 formed about the central water or fluid inlet 42 and a series of discrete outlets 44 spaced circumferentially around the inlet. A resilient valve seal element 46 and a rigid valve cap 48 fit over the seat 40 and within upper end section 38. A pilot valve pin 50 is movable towards and away from seat 40 and has a lower, enlarged end portion 52 extending through a small aperture 54 in the valve cap 48 and another small aperture 56 in the resilient valve seal element 46, the free end portion 52 of the pilot valve pin 50 terminating in the vicinity of the valve seat 40. The pilot valve pin 50 is pivotally connected by valve operating lever 34 and connecting rod 32 to the float 30, as shown in FIG. 1. When the flush tank 12 is full of water, the pilot valve pin 50 is at its lowermost position, as shown in FIG. 3, and as the water level in the tank goes down, the float descends causing the pin to move up. When the pilot valve pin 50 is down at or near its lowermost position, a small amount of water under pressure is admitted from the water inlet tube 26 into a chamber 58 between the resilient valve seal element 46 and the valve cap 48, and forces the seal against the seat 40 to close off the water inlet 42 and the plurality of outlets 44 thereby preventing water from passing through flow passage 59 between the inner and outer tubes 24 and 26, respectively. When the pilot valve pin 50 is raised, the water pressure in the chamber 58 between the valve seal element 46 and the valve cap 48 is relieved, thereby permitting the pressurized inlet water to lift the valve seal element 46 away from the valve seat 40, thus establishing water communication and flow between the fluid inlet 42 and the outlet openings 44.

The ball cock assembly 10 typically includes an anti-siphon assembly 61, as seen in FIG. 2, which serves to prevent the back-up of water out of the flush tank 12 into the water inlet 42 in the event of an excessive loss of water pressure through the supply line 14. If this loss of water pressure occurs, the reverse flow through passage 59 is vented back into the flush tank 12. For this purpose, the anti-siphon assembly 61 is located immediately below the valve seat 40 and above the normal liquid level in the tank. Anti-siphon assembly includes a flexible boot 62 which is received in a cup-shaped section 60 of the upper end section 38 of outlet tube 24. The outer periphery of the boot 62 is located between a shoulder 63 of the upper end 36 of the tube 26 and a groove 65 formed in the upper end section 38. A plurality of vents 66 around the periphery of the upper end section 38 permit air to flow into the inlet. The loss of water pressure in the inlet tube 26 causes a vacuum which draws the boot 62 into contact with the shoulder 63 to close off the water outlets 44, preventing the water from returning through the openings into the inlet flow passage 59 and instead, drawing air through the vents 66 into the inlet flow passage 59. Mounted immediately below the boot 62 is a flexible flow diverter 64 which diverts a portion of the incoming water through flow passage 59 into outlet 68 to fill the toilet bowl.

The upper edge of the upper end section 38 contains a plurality of slots (not shown) around the periphery extending through the wall of the holder and a plurality of radially outwardly extending bayonet joint tabs 71.

A rigid valve cap 48 is adapted to be securely mounted to the upper end section 38. The valve cap 48 contains radially outwardly extending bayonet joint tabs 74 corresponding in number to the inwardly extending tabs 72 (not shown) in the upper end section 38. The valve assembly 28 is seated within upper end section 38, as shown in FIG. 2, and secured in place by turning the valve cap 48 relative to the upper end section 38 until each of the bayonet joint tabs 74 on the valve cap engages an inwardly projecting tab on the end section. A pair of vertical wings 76 on the top of the valve cap 48 permit manual turning of the cap for ready assembly and disassembly with the valve assembly 28.

The inner surface of the generally dome-shaped valve cap 48, as shown in FIG. 4, includes a downwardly facing peripheral groove 78, a plurality of reinforcing ribs 80 to provide strength and rigidity to the cap, and an annular hole 82 extending therethrough. A resilient grommet 84 is press fitted in the hole 82 and is held in place against expulsion from the underside of the cap by the pressure of the water in the chamber 58, as shown in FIG. 2. The grommet 84 contains an annular groove 88 into which one end of rigid, cylindrical hollow sleeve 90 is received. The axial height of the sleeve 90, when the chamber 58 is filled with water under pressure is slightly less than the height of the chamber. When the flush tank 12 is filled to the desired liquid level, the float-controlled pilot valve pin 50 is in the lowered position in the valve assembly. As the liquid is exhausted from the flush tank 12, the float 30 is lowered causing the pilot valve pin 50 to raise. The water pressure in the inlet 42 causes the resilient valve seal element 46 to move toward the valve cap 48. Movement of the valve seal element 46 is limited when the seal 'bottoms out' against the first end 91 of the sleeve 90. This limitation on the range of movement of the valve seal element 46 acts to prevent undue flexing and mechanical failure of the seal.

The resilient valve seal element 46, as shown in FIG. 4, is generally in the shape of a disc having a bottom surface 92 which is contoured to conform to the valve seat 40 and a top surface 94 having a peripheral lip 96 which engages and fits in peripheral groove 78 of the valve cap 48. An annular groove 98 radially inwardly of the lip 96 receives the second end 93 of the cylindrical sleeve 90. The second end 93 of the sleeve 90 received in groove 98 contains at least one (1) and preferably two (2) to four (4) axially extending slots 100 to provide the end 93 of the sleeve 90 with some resiliency and to permit the inner surface 95 of sleeve 90 to slidingly engage the upstanding portion 97 of the valve seal element 46. It has been found that the requisite degree of deflection of the sleeve 90 is achieved when the slots 100 extend between about 40% and about 80% of the axial length of the sleeve. While the sleeve 90 is shown as a hollow right cylinder, it can be formed with other cross-section as desired.

A retainer cover 110 is secured to the upper end section 38 by a plurality of bayonet joint tabs 112 engaging corresponding bayonet joint tabs 71 on the outer periphery of the upper end section 38. The retainer cover 110 includes a resilient gasket 113 to provide a seal between the cover and the upper end section 38. Relative rotation between the retainer cover 110 and the upper end section 38 is prevented by one or more lock tabs 114 extending through a slot in the retainer cover into a space between adjacent bayonet joint tabs 71. One or both sets of bayonet joint tabs 71 and 74 can be tapered to facilitate initial assembly of retainer cover 110 to the end section 38 to assure a tight wedge fit.

On the upper surface of the retainer cover 110 is a buttress 116 including a pair of upwardly extending walls 118a, 118b spaced from one another to receive one end 122 of valve operating lever 34 pivotally held therebetween by pivot pin 120. As previously noted, the other end 124 of the valve operating lever 34 is joined by connecting rod 32 to the float 30.

Referring now to FIGS. 5, 6, 7, and 7A, details of the adjustable features of the riser 131 of the invention are described. As previously mentioned, the riser generally comprises an inlet tube 26, and an outlet tube 24 circumferentially surrounding the inlet tube. The outlet tube 24 consists of a lower tubular shaft portion 24a telescopically received into an upper outer tubular shaft portion 24b. The bottom of the upper outer shaft portion 24b contains external threads 130 to receive an annular lock collar 132. The internal threads 134 on the annular lock collar 132 cooperate with the external threads 130 of the upper outer shaft portion 24b and extend about one-half of the axial distance of the collar. A circumferentially extending shoulder 136 is formed on the inside surface of the annular lock collar 132 between the internal threads 134 and the portion 138 of the collar which has a smaller diameter than the internal threads. The reduced inner diameter of the inner surface 139 of the annular lock collar 132 is slightly larger than the outer diameter of the lower inner shaft 24a thereby permitting the lower shaft to slide within the upper shaft when the collar is threaded into place. The annular lock collar 132 includes at least one, and preferably between two (2) and six (6) spaced slots 140 located on the inside of the collar and extending inward the radial direction with respect to the shafts.

The lower inner shaft 24a terminates at its lower end with a flange 18, gasket 20 and external threads 16 to mount the flush tank 12 as previously described. A plurality of refill outlet ports 142 are located immediately above the flange 18, with water being discharged from the outlet tube 24 through the outlet ports to refill the flush tank 12. The upper end of the lower inner shaft 24a contains one or more external circumferential grooves 144 in which o-rings 146 are inserted to form a fluid-tight slip joint with the interior surface of the upper outer shaft 24b.

Figure 7A:
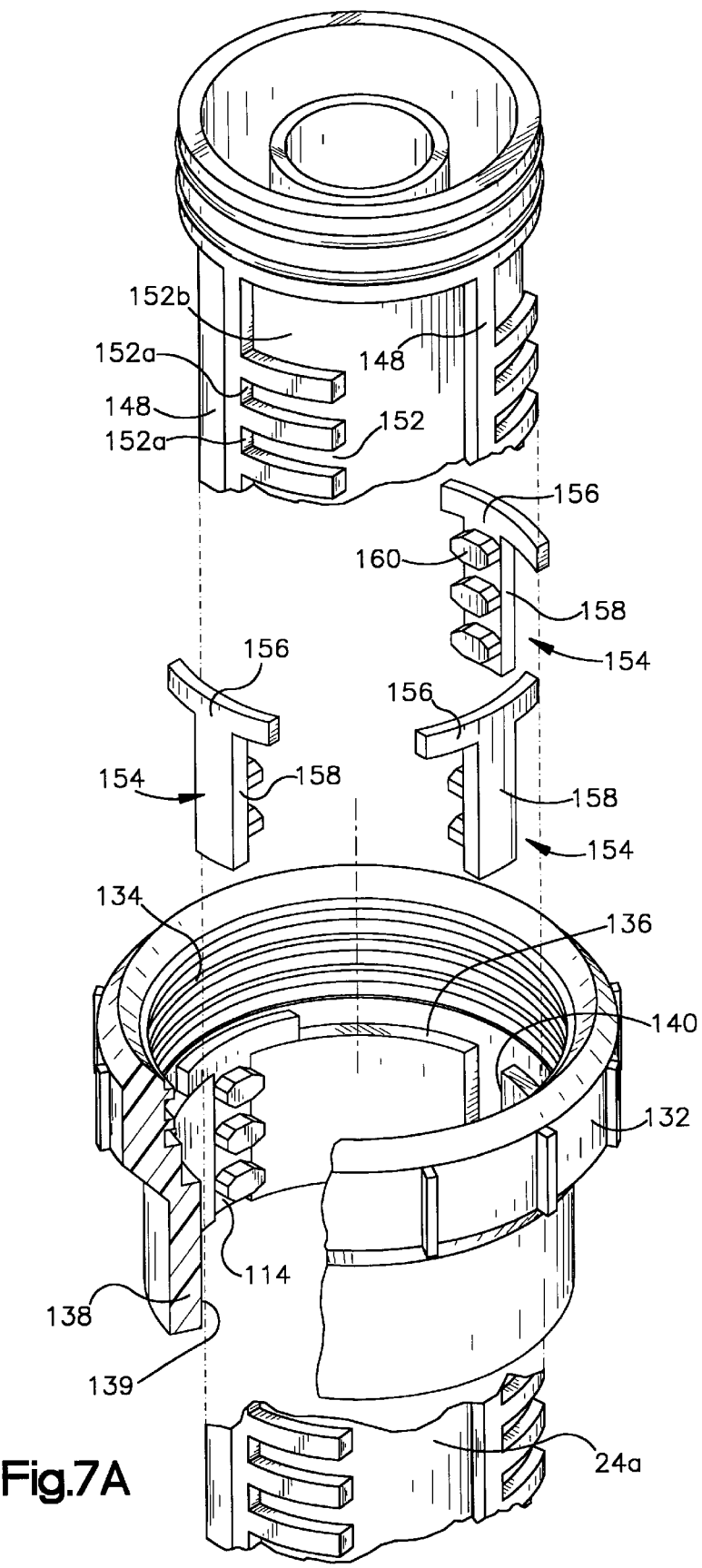
FIG. 7A is an exploded view of a lock collar assembly.

The adjustment feature, as shown in FIGS. 7 and 7A, further comprises at least one and preferably between two (2) and six (6) vertical stops 148 evenly spaced around the exterior of the lower inner shaft 24a. The stops 148 preferably, but not necessarily extend from the water outlet ports 142 at the bottom of the lower inner shaft 24a to the circumferentially extending grooves 144 and o-rings 146 at the top of the shaft. A row of grooves 152 is associated with each vertical stop 148. The grooves 152 are parallel to one another and disposed orthogonally to the vertical stops 148. The grooves 152 are of equal length and extend radially around the lower inner shaft 24a. One end 152a of the grooves 152 in each row abuts against the stop, and the second end 152b terminates remote from the stop. If more than one stop is used, the remote end 152b of the groove extends about one-half of the distance between the stop 148 and the next adjacent stop. Each row of grooves 152 extends in the same direction, that is either clockwise or counter-clockwise from its associated stop toward the next stop.

A removable tab 154 engages each slot 140 in the annular lock collar 132. The number of slots 140 corresponds with the number of stops 148 and rows of grooves 152 on the lower inner shaft 24a. Each tab 154, when disposed in a slot 140, engages one of the grooves 152 upon rotation of the annular lock collar 132 in one direction and disengages the groove 152 when the collar is rotated in the opposite direction. When the tab 164 is disengaged from the groove 152, the upper and lower shaft portions 24a and 24b can be telescopically extended or shortened as needed. The number of adjustment positions is determined by the spacing between adjacent grooves 152. When the requisite height is determined, rotation of the annular lock collar 132 in the reverse direction forces the tab 154 into the groove 152, thereby preventing further telescopic movement.

Preferably, the removable adjustment tab 154 is generally T-shaped with a cross bar 156 and a leg 158. The cross bar 156 is curved to correspond to the circumference of the threads 134 on the interior of the annular lock collar 132. The leg 158 contains at least one (1) and preferably two (2) or three (3) projections 160 which extend radially inwardly therefrom when the tab 154 is positioned in the slot 140, to simultaneously engage one or more grooves 152. When the tab 154 is positioned in the slot 140, the cross bar 156 abuts the internal shoulder 136 of the annular lock collar 132. As the annular lock collar 132 is threaded onto the threaded end 130 of the outer shaft 24b, and is tightened, the cross bar 156 is gripped between the shoulder 136 and the bottom of the inner shaft 24b.

The water inlet tube likewise comprises a two-piece assembly composed of a lower outer shaft 26a and an upper inner shaft 26b. The outer shaft 26a is typically secured to the bottom of the inner shaft 26b beneath the refill outlet ports 142, as shown in FIG. 5. The inner shaft 26b of the inlet tube contains two exterior circular grooves 162, each groove containing an o-ring 163 to form a water-tight slip joint between the two telescoping components 26a, 26b of the inlet tube 26. The upper end of the inlet tube 26 terminates in the valve seat as previously described. In the embodiment shown in FIGS. 5–7, the lower inner shaft 24a contains four (4) vertical stops 148, each with a row of parallel grooves 152 extending from the stop through an arc of about 45°. The annular lock collar 132 contains four (4) slots to receive four (4) T-shaped tabs 154. Each tab 154 includes three (3) projections 160 to simultaneously engage three (3) adjacent grooves 152 in each row.

The ball cock assembly 10 is assembled by slipping the annular lock collar 132 onto the lower inner shaft 24a of the outlet tube 24 with the threaded portion 134 of the collar facing the valve seat 40 and the slotted portions 140 of the collar facing the bottom of the outlet tube 24. Each of the tabs 154 is then slipped into the confined space defined by the slots 140 and the wall of the lower inner shaft 24a, with the leg 158 of the T-shaped tab engaging the slot 140 and the projections 160 facing radially inward. The tabs 154 are inserted when the annular lock collar 132 is rotated so that each slot 140 is aligned in the space between one row of grooves 152 and the next adjacent vertical stop 148. When the tabs 154 are in the slots 140, relative rotation between the annular lock collar 132 and the lower inner shaft 24a is limited to an arc of about 45° or less. Obviously, the size of the arc depends on the number of stops located around the outside of the lower inner shaft 24a.

Figure 8:
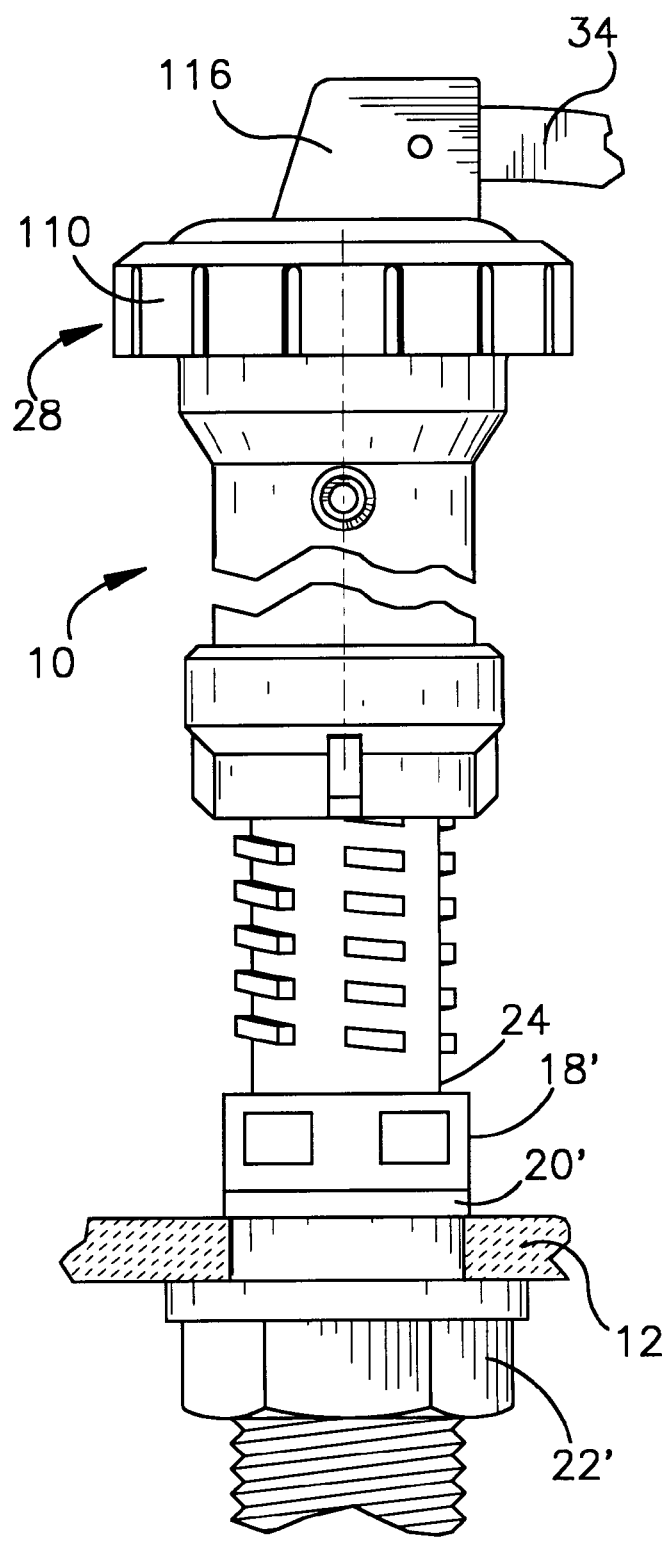
FIG. 8 is an elevational view, of the ball cock assembly with a fixed height riser.

FIG. 8 shows the present invention useful in a ball cock assembly associated with a fixed height riser. The features, absent the adjustability feature, are as described hereinabove. The riser comprises a water inlet tube (not shown) disposed within a water outlet tube 24' surrounding the inlet tube. A flange 18', gasket 20' and flanged nut 22' threaded onto the bottom of the riser, secure the assembly to the bottom of a flush tank 12. Throughout the specification, primed numbers represent structural elements which are substantially identical to structure elements represented by the same unprimed number. The features and operation of the float controlled ball cock valve assembly are the same as that previously described in connection with FIGS. 2–4.

It is apparent that there has been provided in accordance with this invention a ball cock assembly for use with a flush tank that satisfies that objects, means and advantages set forth herein before. According to the invention, a float-controlled ball cock assembly incorporates a two-piece valve assembly to reduce flex fatigue and failure of the valve seal element and to enhance the flow control of the ball cock assembly. Also according to the invention, a novel adjustable riser or a rigid riser can be used in combination with the improved ball cock assembly.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

What is claimed is:

1. A valve assembly for controlling the liquid level in a flush tank of a toilet, said valve assembly comprising:

an inlet tube having a lower end communicating with a liquid supply source and an upper end terminating in a valve seat;

an outlet tube surrounding, and in axial alignment with the inlet tube and in fluid communication therewith with the valve assembly is open;

a rigid valve cap disposed on one side of the valve seat;

a resilient valve seal element disposed between the valve seat and the valve cap;

a pressure chamber formed between the valve cap and the valve seal element;

a pilot valve pin extending through a first opening in the valve seal element and a second opening in the valve cap and selectively controlling liquid pressure in the pressure chamber to cause the valve seal element alternately to be forced into sealing engagement with the valve seat when the liquid in the tank is above a predetermined level, and moved out of sealing engagement with the valve seat, in a direction of the valve cap, when the liquid in the tank is below the predetermined level; and a rigid, cylindrical hollow sleeve disposed in the pressure chamber about the valve pin and having an axial height which is slightly less than the height of the pressure chamber so as to limit movement of the valve seal element in the direction of the valve cap for selectively controlling liquid pressure in the pressure chamber to move the valve seal element between an opened and a closed position.

2. The valve assembly, according to claim 1, wherein:

the valve cap includes a grommet securely mounted in the second opening through the valve cap;

the valve seal element having first and second opposed generally parallel surfaces, the first surface facing an inner surface of the cap and having a raised peripheral edge to engage a groove formed about the periphery of the inner surface of the cap and having a groove coaxially aligned with the grommet to receive the second end of the sleeve, and the second surface of the seal adapted for sealing engagement with the valve seat.

3. The valve assembly, according to claim 2, wherein the sleeve is a rigid annular sleeve in the shape of a hollow cylinder and has a plurality of slots spaced around the periphery of the sleeve and extending from a second end of the sleeve in an axial direction toward the first end of the sleeve.

4. The valve assembly, according to claim 3, wherein each of the plurality of slots extends axially between about 40% and about 80% of the distance from the second end of the sleeve toward the first end of the sleeve.

5. The valve assembly, according to claim 3, wherein the second end of the sleeve is received in the groove in the valve seal element and the first end of the sleeve is received into an annular groove in the grommet.

* * * * *